(12) United States Patent
King et al.

(10) Patent No.: US 7,595,597 B2
(45) Date of Patent: Sep. 29, 2009

(54) VEHICLE PROPULSION SYSTEM

(75) Inventors: Robert Dean King, Schenectady, NY (US); Xianghui Huang, Schenectady, NY (US); Gary Raymond Kilinski, Scotia, NY (US)

(73) Assignee: General Electric Comapany, Schenectady, NY (US)

( * ) Notice: Subject to any disclaimer, the term of this patent is extended or adjusted under 35 U.S.C. 154(b) by 152 days.

(21) Appl. No.: 11/614,412

(22) Filed: Dec. 21, 2006

(65) Prior Publication Data

US 2007/0164693 A1    Jul. 19, 2007

Related U.S. Application Data

(60) Provisional application No. 60/759,991, filed on Jan. 18, 2006.

(51) Int. Cl.
  *B60K 6/28* (2007.10)
  *B60L 11/12* (2006.01)
  *B60W 20/00* (2006.01)

(52) U.S. Cl. ...................................... 318/139; 318/106

(58) Field of Classification Search ......... 318/106–109, 318/139
  See application file for complete search history.

(56) References Cited

U.S. PATENT DOCUMENTS

| | | | |
|---|---|---|---|
| 4,533,011 A | 8/1985 | Heidemeyer et al. | |
| 4,862,009 A | 8/1989 | King | |
| 4,926,104 A | 5/1990 | King et al. | |
| 5,168,975 A | 12/1992 | Bernhardt et al. | |
| 5,345,154 A | 9/1994 | King | |
| 5,373,195 A | 12/1994 | De Doncker et al. | |
| 5,589,743 A | 12/1996 | King | |
| 5,710,699 A | 1/1998 | King et al. | |
| 5,713,425 A | 2/1998 | Buschhaus et al. | |
| 5,722,502 A | 3/1998 | Kubo | |
| 5,723,956 A | 3/1998 | King et al. | |
| 5,780,980 A * | 7/1998 | Naito .......................... 318/139 |
| 5,903,449 A | 5/1999 | Garrigan et al. | |
| 5,949,658 A | 9/1999 | Thottuvelil et al. | |
| 6,170,587 B1 | 1/2001 | Bullock | |

(Continued)

FOREIGN PATENT DOCUMENTS

DE            102 13 105 A1    11/2002

(Continued)

OTHER PUBLICATIONS

The European Search Report, dated May 11, 2007, for Application No. 07100757.9-1523.

(Continued)

*Primary Examiner*—Bentsu Ro
(74) *Attorney, Agent, or Firm*—Armstrong Teasdale LLP

(57) ABSTRACT

A vehicle propulsion includes an alternating current (AC) traction drive, a first energy storage system electrically coupled to the traction drive through a direct current (DC) link, a second energy storage system electrically coupled to the traction drive such that the voltage output from the second energy storage system is decoupled from the DC link using a bi-directional boost converter, and an energy management system configured to control said first and second energy storage systems when the vehicle is operating in at least one of a pre-charge mode and a normal operation mode with the traction drive system enabled.

24 Claims, 13 Drawing Sheets

U.S. PATENT DOCUMENTS

| | | | |
|---|---|---|---|
| 6,186,255 | B1 | 2/2001 | Shimasaki et al. |
| 6,227,997 | B1 | 5/2001 | Fujisawa et al. |
| 6,258,006 | B1 | 7/2001 | Hanyu et al. |
| 6,319,168 | B1 | 11/2001 | Morris et al. |
| 6,331,365 | B1 | 12/2001 | King |
| 6,332,257 | B1 | 12/2001 | Reed, Jr. et al. |
| 6,360,834 | B1 | 3/2002 | Gauthier |
| 6,401,850 | B1 | 6/2002 | Bowen |
| 6,441,581 | B1 | 8/2002 | King et al. |
| 6,478,705 | B1 | 11/2002 | Holmes et al. |
| 6,481,517 | B1 | 11/2002 | Kobayashi et al. |
| 6,486,568 | B1 | 11/2002 | King et al. |
| 6,507,128 | B2 | 1/2003 | King et al. |
| 6,533,692 | B1 | 3/2003 | Bowen |
| 6,533,693 | B2 | 3/2003 | Bowen et al. |
| 6,569,055 | B2 | 5/2003 | Urasawa et al. |
| 6,592,484 | B1 | 7/2003 | Tsai et al. |
| 6,603,215 | B2 | 8/2003 | Kuang et al. |
| 6,604,591 | B2 | 8/2003 | Bowen et al. |
| 6,645,105 | B2 | 11/2003 | Kima |
| 6,679,799 | B2 | 1/2004 | Bowen |
| 6,729,423 | B2 | 5/2004 | Kobayashi et al. |
| 6,737,822 | B2 * | 5/2004 | King ........................ 318/375 |
| 6,784,563 | B2 | 8/2004 | Nada |
| 6,817,432 | B2 | 11/2004 | Kitada et al. |
| 6,837,816 | B2 | 1/2005 | Tsai et al. |
| 6,915,220 | B2 | 7/2005 | Cardinal et al. |
| 7,349,797 | B2 | 3/2008 | Donnelly et al. |
| 2001/0051291 | A1 | 12/2001 | Aoyagi et al. |
| 2004/0062059 | A1 * | 4/2004 | Cheng et al. .................. 363/17 |
| 2005/0122071 | A1 | 6/2005 | King et al. |
| 2007/0007939 | A1 * | 1/2007 | Miller et al. ................ 323/299 |

FOREIGN PATENT DOCUMENTS

| | | |
|---|---|---|
| EP | 1 366 948 A1 | 12/2003 |
| EP | 1500549 A2 | 1/2005 |

OTHER PUBLICATIONS

An espacenet online English language translation of German Patent No. DE 102 13 105 A1, 2002.

\* cited by examiner

VEHICLE PROPULSION SYSTEM

CROSS REFERENCE TO RELATED APPLICATIONS

This application is entitled to the benefit of, and claims priority to, provisional U.S. Patent Application Ser. No. 60/759,991 filed Jan. 18, 2006, and entitled "Electric Drive Energy Management System Control with Multiple Energy Storage Units", which is hereby incorporated by reference in its entirety.

BACKGROUND OF THE INVENTION

This invention relates generally to vehicle drive systems and, more particularly, to battery powered drive systems such as are used in battery powered electric vehicles or hybrid vehicles.

FIG. 1 illustrates a known alternating current (AC) electric drive system that is used in battery electric vehicles and also hybrid vehicles. As shown, the energy storage unit, which may be a battery, is electrically connected to the direct current (DC) link of an DC-AC traction inverter.

FIG. 2 illustrates a known hybrid drive system that includes a first battery that is coupled to the low voltage side of the boost converter and a second battery that is coupled to the high voltage side of the boost converter. During operation, this configuration may allow a high specific-energy battery to be used as the energy storage unit, where the voltage rating of the low-side energy storage unit is generally lower than the DC link of the DC-AC traction inverter.

FIG. 3 illustrates a known hybrid drive system that includes a high specific-energy battery, an ultracapacitor, and a diode that is poled to allow current flow when the ultracapacitor voltage is lower than the voltage of the battery when arranged in the configuration shown in FIG. 3. The configuration in FIG. 3 allows increased levels of power to be transmitted from the battery to the DC link through a two-channel boost converter, where each channel or phase has the same maximum power rating.

While the above described systems are effective during various driving conditions, they may be less effective when the vehicle is operated at relative low speeds as seen during typical urban driving. As a result, the performance or fuel efficiency of the vehicle may be reduced.

BRIEF DESCRIPTION OF THE INVENTION

In one aspect, a vehicle propulsion system is provided. The propulsion system includes an alternating current (AC) traction drive, a first energy storage system electrically connected to the traction drive through a direct current (DC) link, a second energy storage system electrically connected to the traction drive such that the voltage output from the second energy storage system is decoupled from the DC link using a bi-directional boost converter, and an energy management system configured to control said first and second energy storage systems when the vehicle is operating in at least one of a pre-charge mode and a normal operation mode with the traction drive system enabled.

DETAILED DESCRIPTION OF THE INVENTION

Described herein are control and power storage systems that may be utilized with an electric or hybrid vehicle. Hybrid vehicle as used herein represents a vehicle that utilizes a combination of an electric motor and a heat engine to provide propulsive force to the vehicle. Moreover, as used herein, an electric vehicle represents a vehicle that includes a motor and a plurality of batteries, wherein the batteries provide at least a portion of the propulsive force to operate the vehicle.

The systems include an alternating current (AC) traction drive, a first energy storage system electrically connected to the traction drive through a direct current (DC) link, a second energy storage system electrically connected to the traction drive such that the voltage output from the energy storage system is decoupled from the DC link using a bi-directional boost converter, and a uni-directional current device that is poled to conduct current from low voltage side of the boost converter to the high voltage side of the boost converter.

Figure 1:
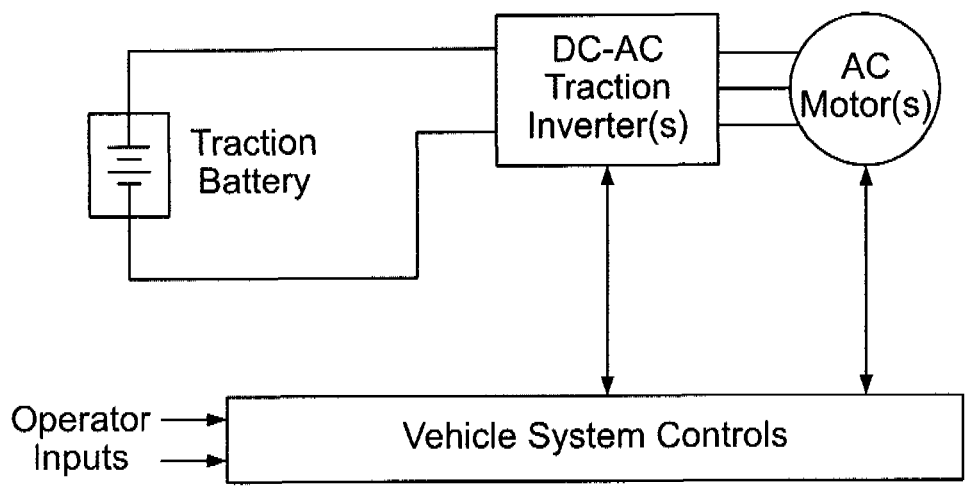
FIG. 1 illustrates a known alternating current (AC) electric drive system.
Figure 3:
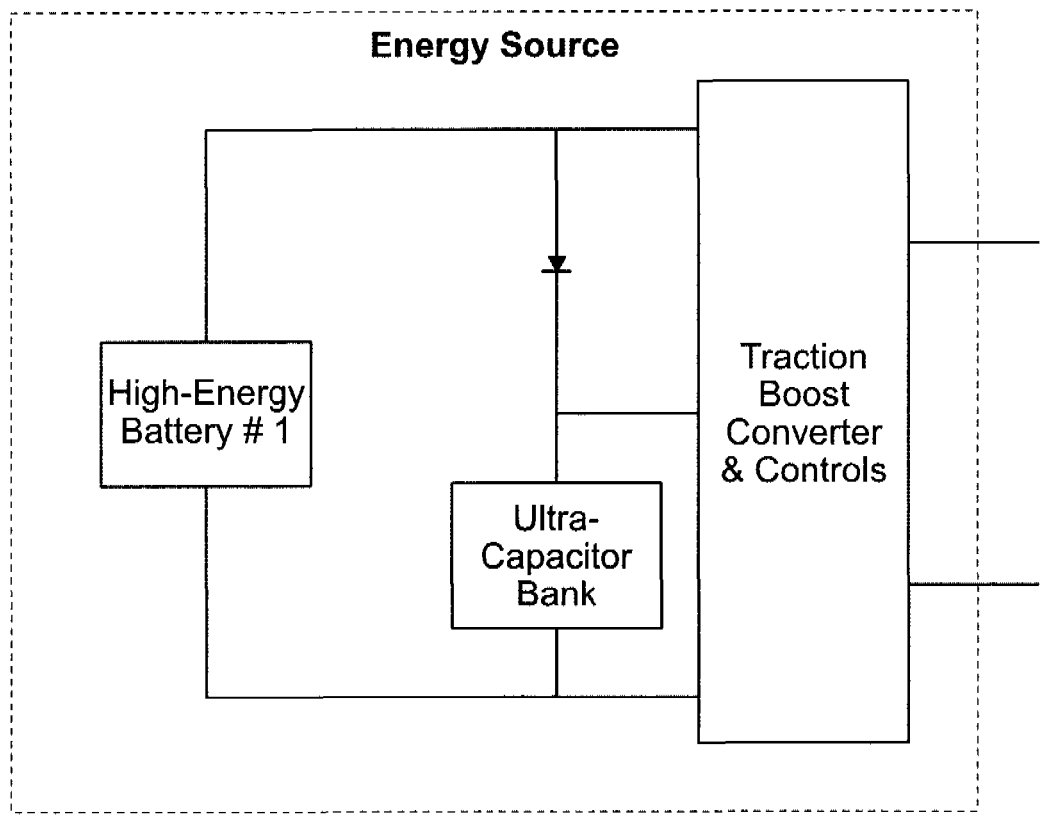
FIG. 3 illustrates a known hybrid drive system.
Figure 2:
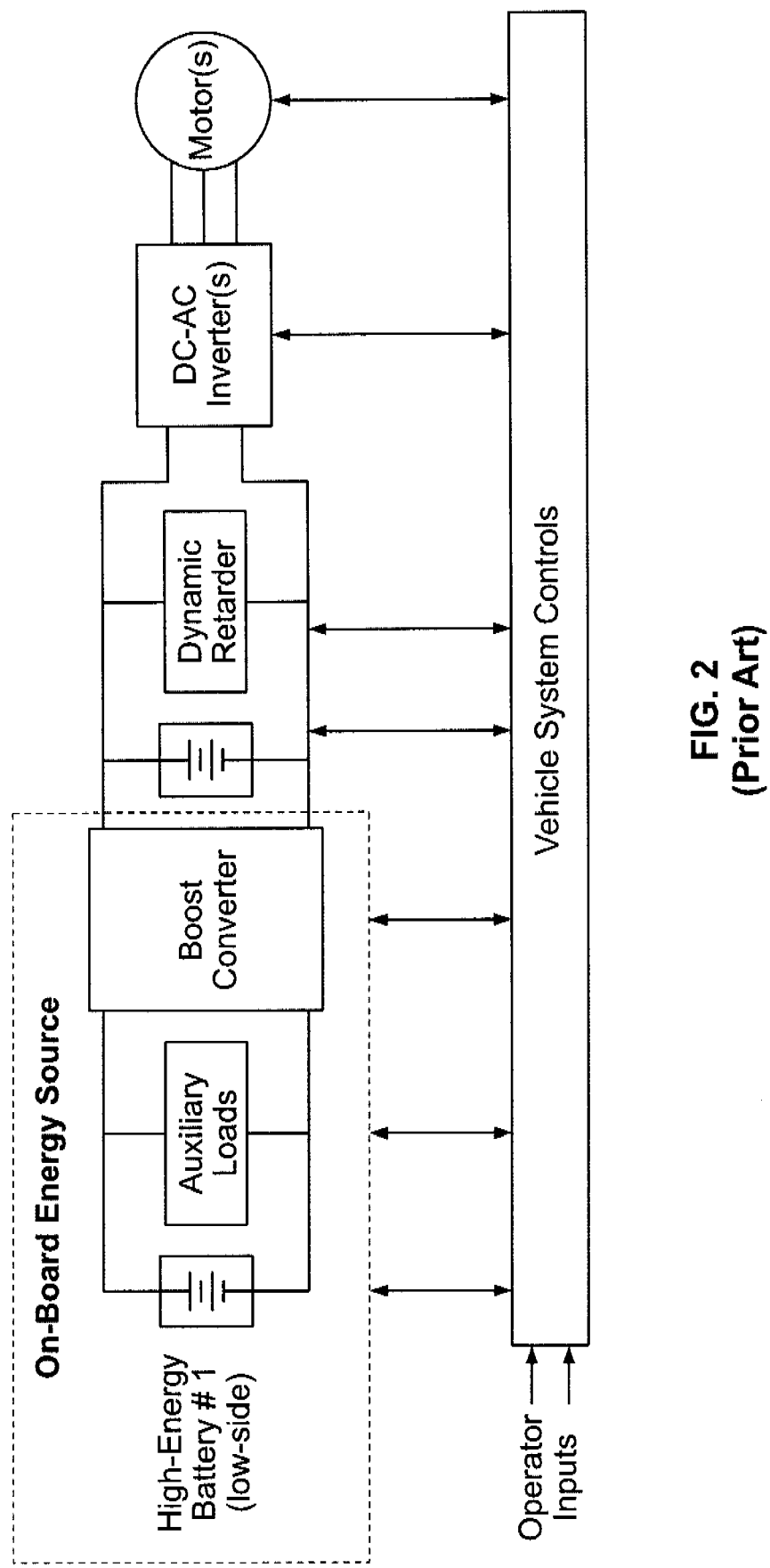
FIG. 2 illustrates a known hybrid drive system.
Figure 4:
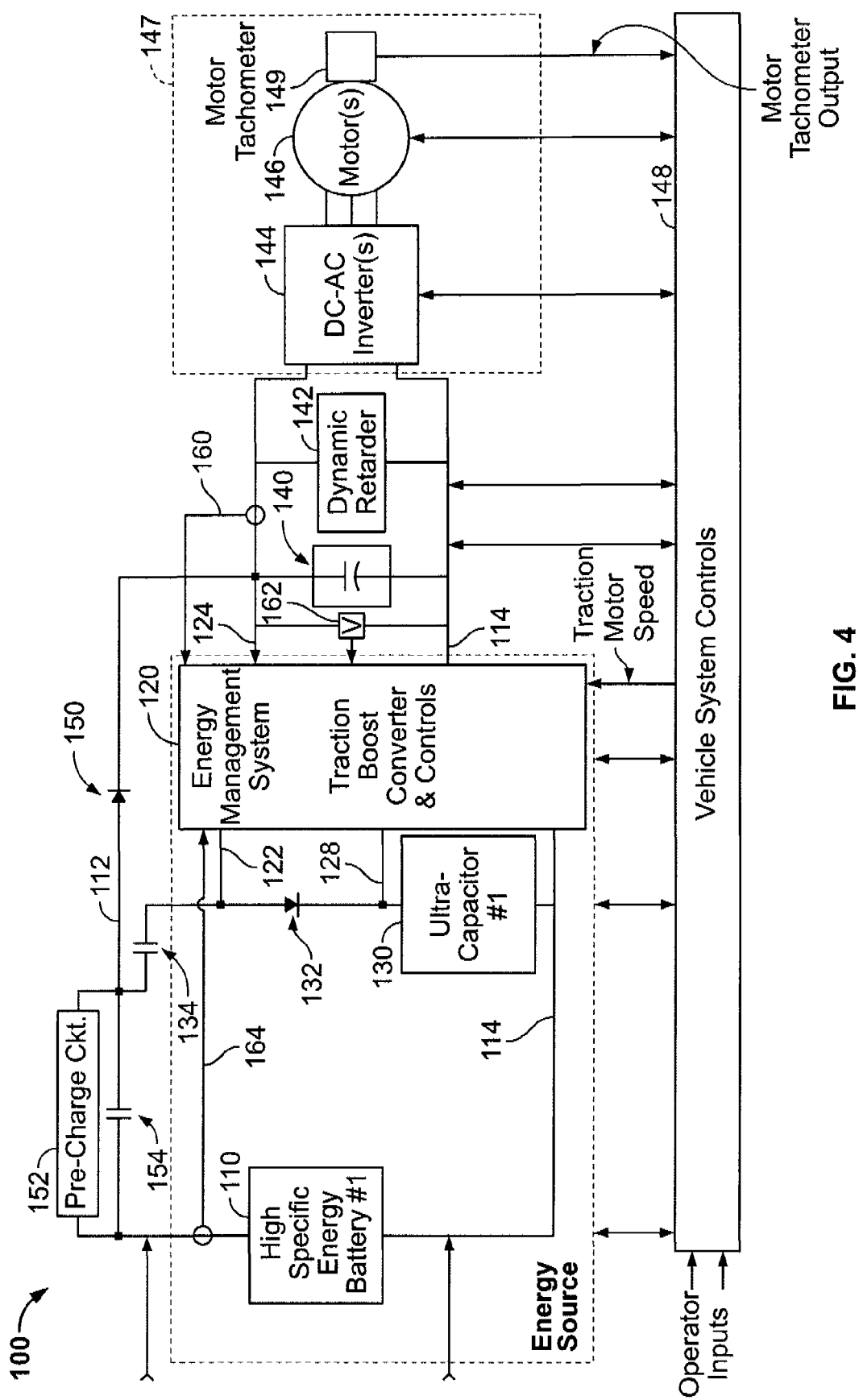
FIG. 4 illustrates an exemplary vehicle propulsion system.

Specifically, FIG. 4 illustrates an exemplary vehicle propulsion system 100 that includes a second storage unit 110 that has an input or negative terminal that is coupled to a first bus 114 also referred to a negative DC link, and an output or positive terminal that is electrically coupled to a second bus 112 also referred to a positive DC Bus. In the exemplary embodiment, the second storage unit 110 is a high specific energy battery that is electrically coupled between the positive and negative DC bus 112 and 114 respectively. As such, the negative terminal of high energy battery 110 and an ultracapacitor 130 are each electrically coupled to the negative DC link 114 of a boost converter and DC-AC inverter.

System 100 also includes an Energy Management System (EMS) 120 that includes a boost converter circuit (circuit details not shown) to boost the voltage available from the second storage unit 110. The boost converter circuit may include an inductor (not shown) that couples the second bus 112 to a semiconductor-switching device (not shown). The semiconductor-switching device couples to the high voltage side 124 of the EMS 120 that is referred to as the high-side DC Link. The term DC link or sometimes Inverter DC link is used herein to refer to the positive and negative DC busses 124 with respect to 114. The negative portion of the DC link is electrically connected to the negative terminal of the high specific energy battery 110 and the negative terminal of a first passive storage device 140, and the negative terminal of the DC-AC Inverter 144. More specifically, the EMS 120 has an input side 122 that sees a voltage that is approximately equivalent to the voltage of the second storage unit 110 and converts this voltage to a first higher voltage that is seen at the EMS output side 124. Thus the boost converter output side 124 is referred to as the high voltage side of the circuit. System 100 also includes a current sensor 160 and a voltage sensor 162 that are transmitted to EMS 120 and utilized by EMS 120 to monitor the respective voltage and DC link load current on the EMS high voltage side 124. System 100 also includes a current sensor 164 to monitor the respective current of the second high specific energy battery 110. Current sensor 164 is configured to sense current during initial precharge, normal operation, and also during use with an optional off-board battery charger (not shown). Current and voltage sensors (internal to the EMS) provide monitoring on the EMS low-side 122 and 128 respectively.

System 100 also includes a second passive storage device 130, such as ultracapacitor 130 for example, connected to a second channel 128 of the low side of the boost converter through an inductor (not shown). A unidirectional conducting apparatus 132, such as a diode for example, is poled to conduct current from the high-energy battery input channel of the boost converter to the ultracapacitor 130. As shown, the passive storage device 130, the unidirectional conducting apparatus 132, and a contactor 134 are wired in series between the positive DC bus 112 and the negative DC link 114 on the second channel boost converter low voltage side 128. Ultracapacitor as used herein represents a capacitor comprised of multiple capacitor cells connected in a series arrangement where the capacitor cells each have a capacitance that is greater than 500 Farads. Ultracapacitors are often referred to as "double-layer" capacitors or supercapacitors. In the exemplary embodiment, ultracapacitor 130 has 63 cells connected in series wherein each cell has voltage rating of approximately 2.7 volts and a capacitance value that is greater than 1000 Farads per cell.

System 100 also includes a first passive storage device 140 that is coupled between the positive DC link 124 and the negative DC link 114 in parallel with the boost converter 120. Specifically, the passive storage device 140 is coupled in parallel with the high voltage side 124 of the boost converter 120. In the exemplary embodiment, the first storage device 140 is an ultracapacitor.

System 100 also includes a dynamic retarder system 142 that is coupled between the positive DC link 124 and the negative DC link 114 in parallel with the first storage device 140, and a traction motor 146 that is coupled to inverter 144. The combination of the inverter 144 and traction motor 146 is often referred to as a traction drive system 147. An AC motor speed sensing device, such as a motor tachometer 149, provides an electrical signal proportional to motor speed and direction of rotation. In the exemplary embodiment, the dynamic retarder system 142 may include a high power dissipation grid resistor, a serially connected switching device, and a flyback diode that is connected in anti-parallel with the switching device to controllably vary the effective resistance impressed on the DC link 124 and thereby limit the DC voltage developed on link 124 when traction motor 146 is operated in a regenerative mode returning electric power to the link through the inverter 144.

In one embodiment, inverter 144 is a DC-to-AC inverter for supplying alternating current and traction drive system 147 utilizes an AC motor 146. Optionally, inverter 144 is a DC chopper or pulse width modulation circuit for providing direct current, and traction drive motor 146 is a DC motor. System 100 also includes a control system referred to herein as a Vehicle Systems Control (VSC) 148 that is configured to operate system 100 in various modes that will be discussed later herein.

In the exemplary embodiment, system 100 also includes a external uni-directional current device 150 that is poled to allow current flow from the second storage unit 110 to the high voltage side 124 of the traction boost converter 120, a pre-charge circuit 152 and at least one DC contactor 154. In the exemplary embodiment, the uni-directional current device 150 is a diode. In use, external uni-directional current device 150 facilitates channeling current from the pre-charge circuit 152 to the high-side 124 of the traction boost converter 120 to at least partially pre-charge the high-side ultracapacitor 140 from it's initial assumed discharge state, and also provides power to the traction drive system 147 during a "Limp-home" mode of operation in event of failure of the boost converter system.

During operation, the high-side ultracapacitor 140 is quickly pre-charged using pre-charge circuit 152 to approximately the nominal voltage of the high-specific energy battery 110 that is coupled on the low-side 122 of the boost converter 120. Energy for this initial pre-charge function is provided by the high-specific energy battery 110 and may be completed while the vehicle is stationary within a few seconds of the operator initiating start-up via the ignition switch command, for example. After the initial pre-charge of the ultracapacitor 140 is complete, DC contactor 154 is energized and it's associated power contacts are electrically closed. At this point in time, the traction drive system 147 may be enabled such that the vehicle may be operated at a relatively slow speed. An additional increase voltage to the high-side voltage 124 may be provided by the traction drive 147 during vehicle regenerative braking, while the vehicle is decelerating, and/or from the heat engine in a hybrid vehicle application.

Under normal mode of operation, the low-side ultracapacitor 130 is partially pre-charged using energy from the high side supplied from the high-specific energy battery 110. After partial pre-charge of the low-side inputs 122, 128 of the boost converter 120, DC contactor 134 is closed and pre-charge of ultracapacitor 140 continues via the boost converter 120. In use, the maximum voltage of ultracapacitor 130 is at least approximately twice the voltage of the high-specific energy battery 110, however it is possible that maximum voltage of ultracapacitor 130 could be approximately twenty-five times greater than the voltage of high specific energy battery 110. Moreover, during normal operation, ultracapacitor 130 operates from its maximum voltage down to approximately 50% of its maximum voltage to extract approximately 75% of its total stored energy (useable energy). In the event that ultracapacitor 130's useable energy is exhausted and the operator continues to require additional power to operate the vehicle, diode 132 conducts and the boost converter 120 now operates in a highly efficient mode, in this two-phase boost converter example, with approximately twice the power capability to boost the voltage from the high-specific energy battery 110 to the traction drive system 147. A dynamic retarder function 142 and its' associated control, is provided on the high side of the boost converter 120.

Figure 5:
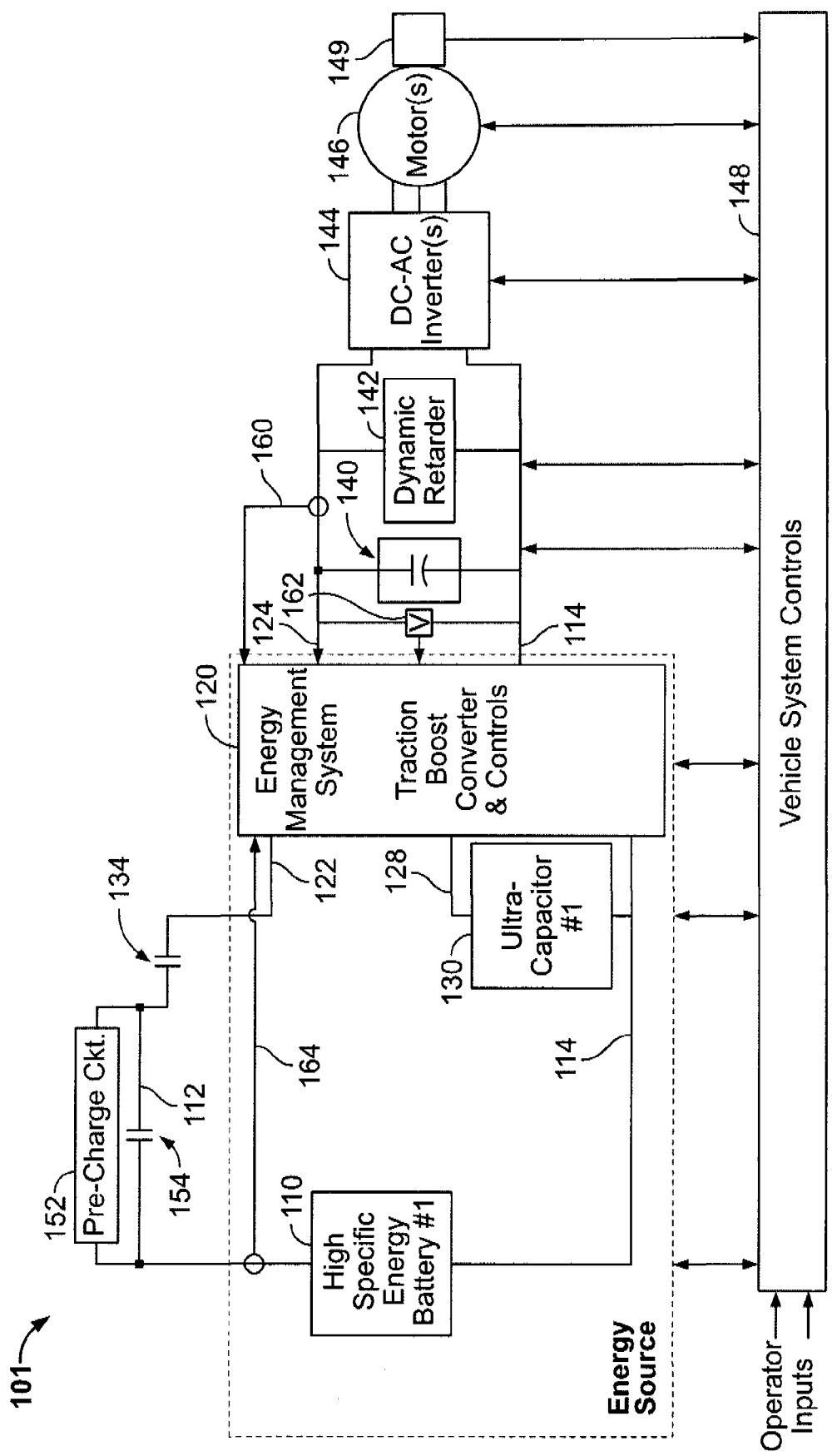
FIG. 5 illustrates another exemplary vehicle propulsion system.

FIG. 5 illustrates a vehicle system 101 that is substantially similar to vehicle system 100 shown in FIG. 4. In this embodiment, vehicle system 101 does not include unidirectional conducting apparatus 132 (shown in FIG. 4). As such, in this embodiment, current is not conducted through a diode from the high-energy battery input channel of the boost converter to the ultracapacitor 130. Moreover, system 101 does not include external uni-directional current device 150 (shown in FIG. 4). As such, in this embodiment, current flow is not poled from the first storage unit 110 to the high voltage side 124 of the traction boost converter 120, by a device external to the energy management system 120.

Figure 6:
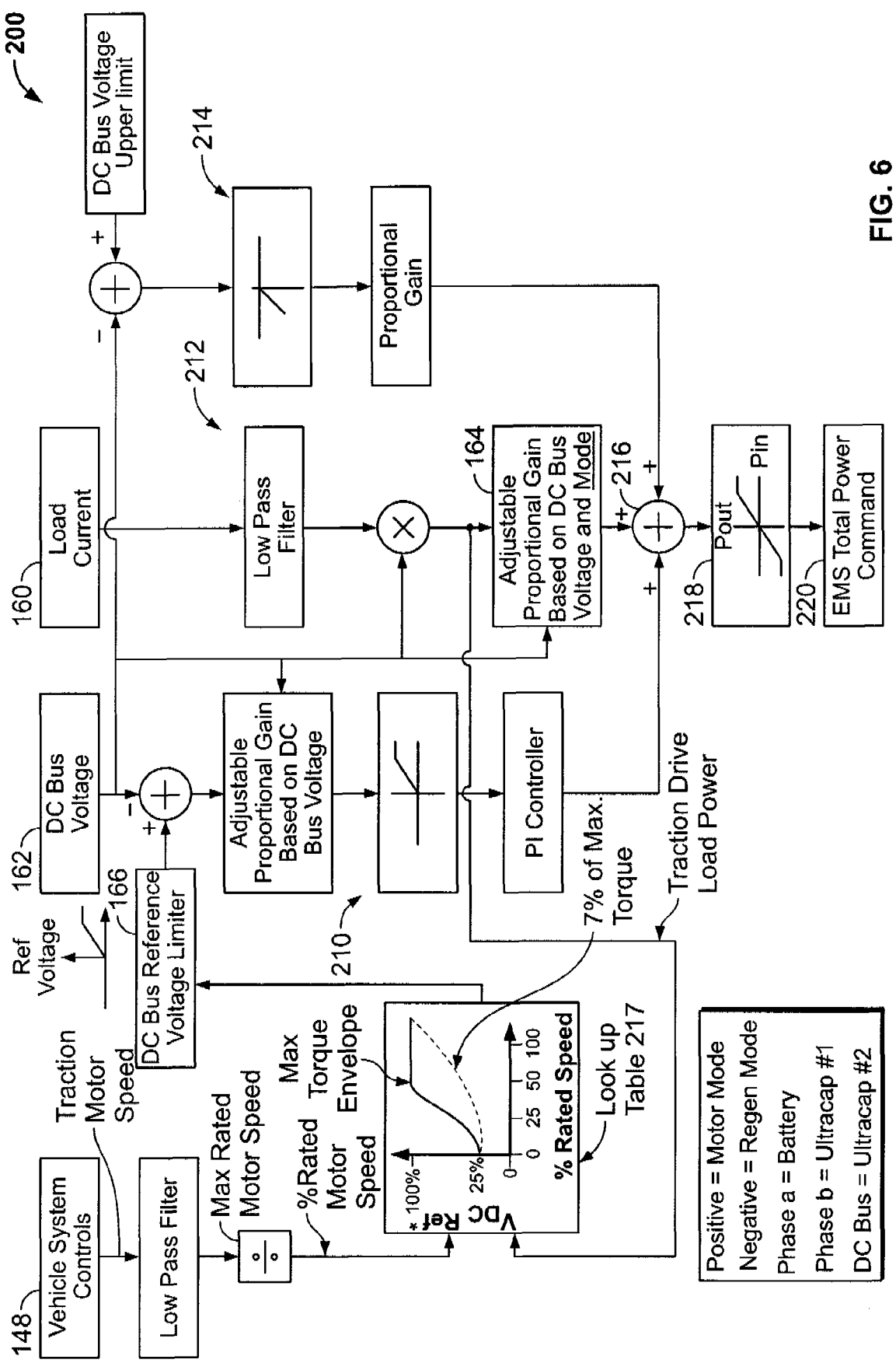
FIG. 6 is a flow chart illustrating an exemplary algorithm for controlling a vehicle propulsion system.

FIG. 6 is a flow chart illustrating a power control algorithm 200 that is programmed into EMS 120 (shown in FIG. 4). In the exemplary embodiment, at least four inputs are provided to EMS 120. These inputs include at least a DC bus voltage sensed by voltage sensor 162, DC load current sensed by current sensor 160, traction motor speed sensed by motor tachometer 149 and processed in vehicle system controls 148, and a mode signal 164 indicating when the hybrid vehicle drive is operating in the motoring mode, i.e. positive torque when the vehicle is operating in the forward direction, or the regenerative mode, i.e. negative motor torque, while the vehicle is operating in the forward direction. As discussed above, the motor and regenerative modes also exist while the vehicle is operating in the reverse direction.

In the exemplary embodiment, algorithm 200 includes separate subroutines that are combined to generate the Total EMS Power Command 220. The first subroutine 210 includes a proportional-integral controller (PI controller or PID controller) that receives an input from DC bus voltage sensor 162, and based on this signal drives the high side voltage side 124 (shown in FIGS. 4 and 5) towards a varying DC bus reference voltage 166. A second subroutine 212 receives and filters the current signal transmitted from sensor 160, that after multiplication with the DC Bus voltage sensed signal computes the traction drive load power. Traction drive load power is multiplied by an adjustable gain that is based on the value of the DC bus voltage 162 and the specific mode of operation signal 164. A third subroutine 214 generates a proportional gain that is used for overvoltage protection. Varying DC Bus Reference Voltage 166 signal is computed within subroutine 210 using a two-dimensional look-up table 217, as follows: after low pass filtering is performed on the traction motor speed received from Vehicle System Controls 148, the processor computes a signal representative of the % motor rated speed signal that is one input to look up table 217. The computed traction drive load power as part of subroutine 212 is a second input to the lookup table 217. Lookup table 217 is configured to provide a DC bus reference voltage command output signal that varies as a function of motor speed for a family of motor torque curves in an optimized manner that minimize motor and drive component system losses to improve drive system efficiency, especially during low speed, light torque operation. The outputs from subroutines 210, 212, and 214, are then summed together 216 and passed through an asymmetric limiter function 218 to generate the EMS Total Power command 220 which, in the exemplary embodiment, is the command that determines the power supplied to traction drive system 147 via bus 124 (shown in FIGS. 4 and 5). In operation, the asymmetric limiter 218 allows for higher levels of negative or regenerative power as compared to the positive power associated with motoring operation.

Figure 7:
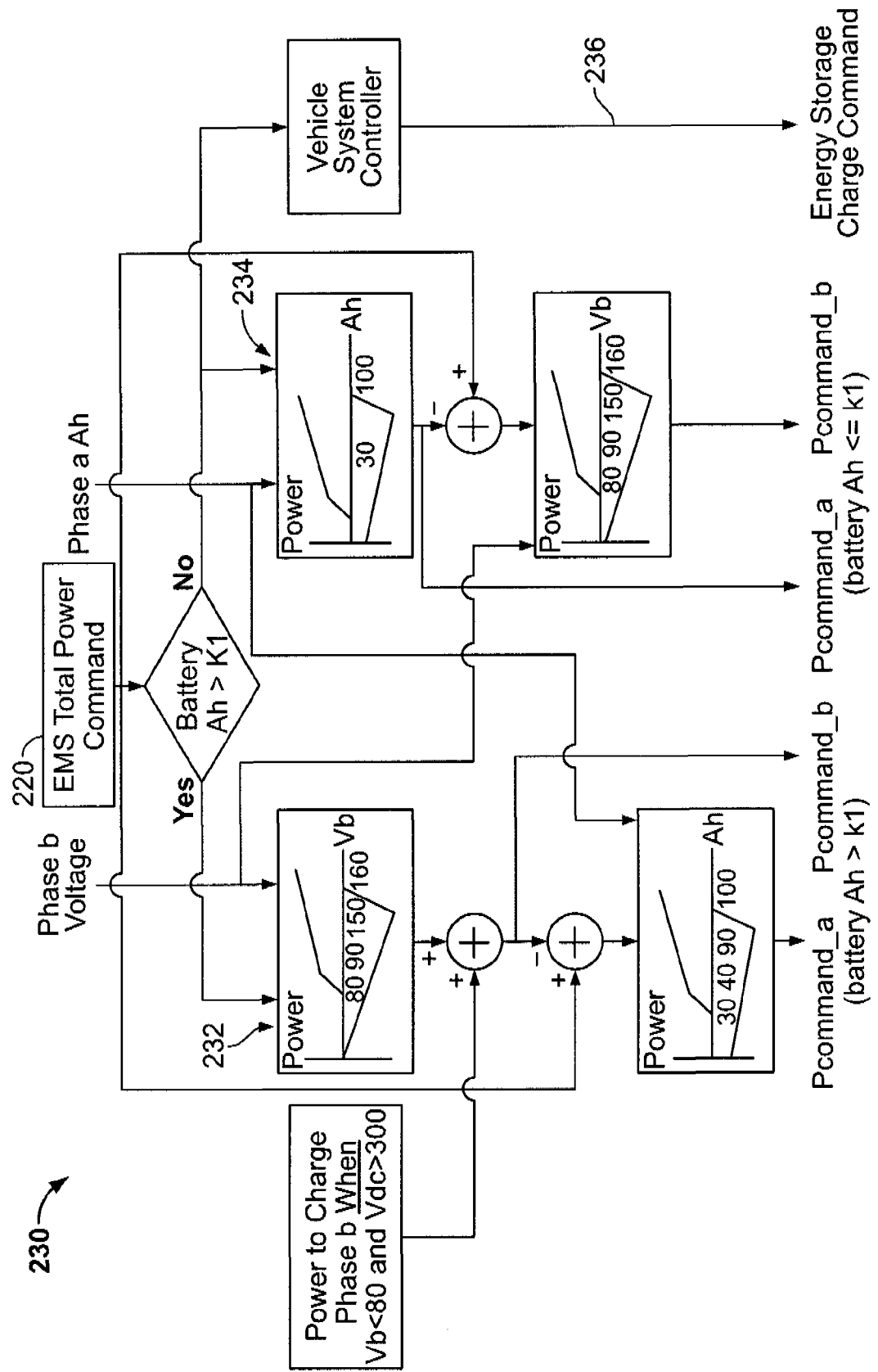
FIG. 7 is a flow chart illustrating another exemplary algorithm for controlling a vehicle propulsion system.

FIG. 7 is a flow chart illustrating another power control algorithm 230 that is programmed into EMS 120 (shown in FIG. 4). In this exemplary embodiment, the EMS Total Power Command 220 is distributed between the low-side ultracapacitor 130 and the relatively low-voltage high specific energy battery 110. A battery DC current sensed by current sensor 164 is input to the EMS controls and is used to compute the Ampere Hour (AH) of the high specific energy battery 110. Algorithm 230 is a function of the instantaneous battery Ampere Hour (AH) and the voltage of the low-side ultracapacitor 130. In use, if the AH of battery 110 is above a predetermined threshold, algorithm 230 implements a first subroutine 232, wherein a higher portion of the power is distributed to the ultracapacitor 130 that is controlled by phase b of the boost converter. More specifically, a piecewise linear limit function of Power versus sensed phase b voltage of the boost converter is used to limit the power command. In the exemplary embodiment, a different power limit function is used depending if the mode is motoring or regenerating. Providing that the requested power is not being limited, the sum of the Phase a power command plus the Phase b power command is equal to the EMS Total Power Command 220.

Optionally, If the battery 110 Ah is below a specified threshold, algorithm 230 implements a second subroutine 234, wherein a higher portion of the power is distributed to the battery 110 that is controlled by phase a of the boost converter. Moreover, an additional signal 236 referred to herein as the Energy Storage Charge Command, is sent to the Vehicle System Controller (VSC) 148 to increase the charge power. Piecewise linear limit function of Power versus sensed battery current and computed Ampere Hour (AH) of the boost converter is used to limit the power command. A different power limit function is used depending if the mode is motoring or regenerating, i.e., if motoring the limit is always zero. Providing that the requested power is not being limited, the sum of the Phase a power command plus the Phase b power command is equal to the EMS Total Power Command 220.

Figure 8:
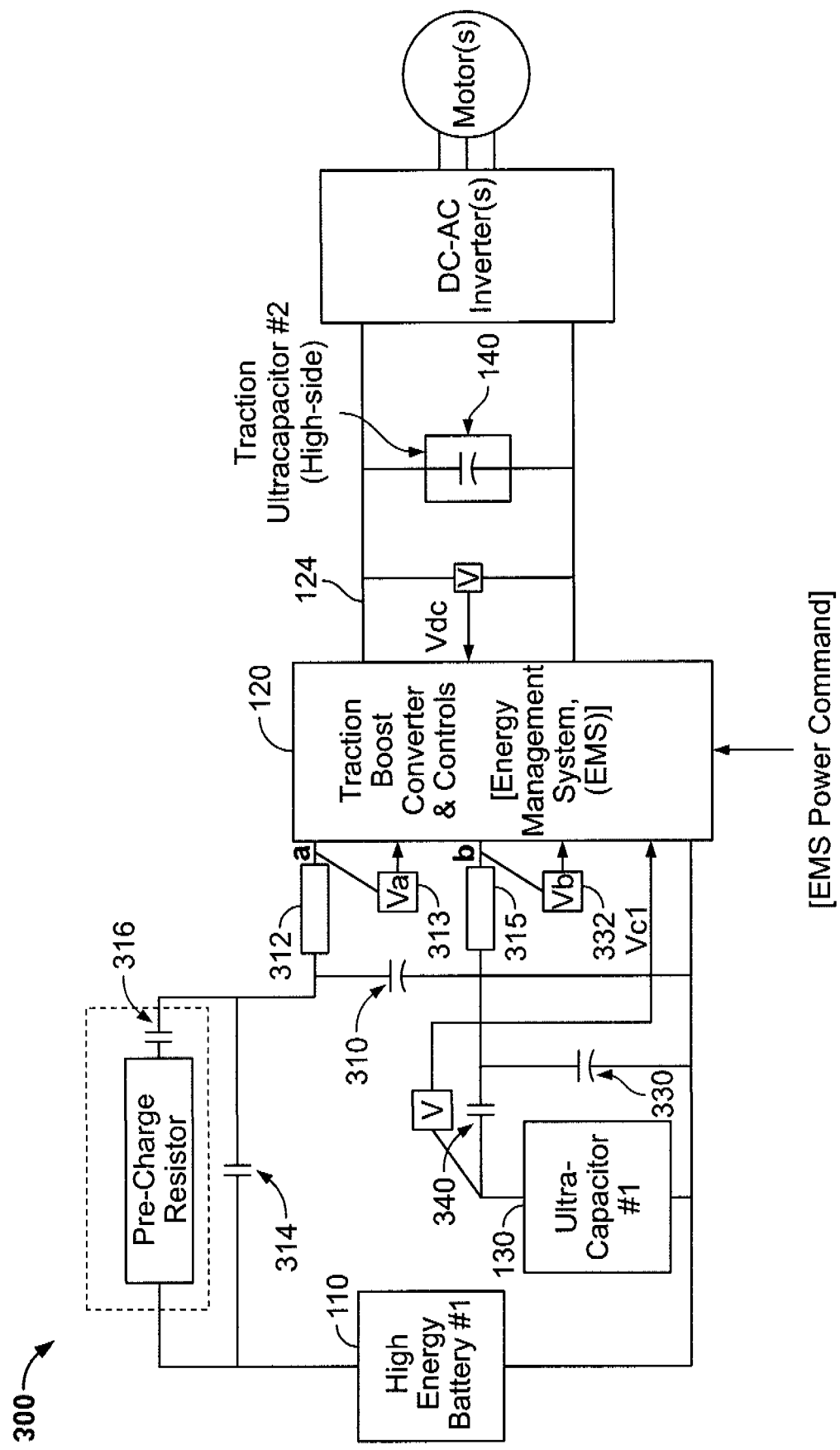
FIG. 8 illustrates another exemplary vehicle propulsion system.

FIG. 8 illustrates a system 300 that is substantially similar to system 100 shown in FIG. 4. As such numbers used to indicate components in FIG. 4 will be used to indicate the similar component in FIG. 8. In this embodiment, the partial pre-charge of the high-side ultracapacitor 140 is provided in the same manner shown in FIG. 4, however the pre-charge apparatus and control for the low-side energy storage unit(s) is simplified. More specifically, system 300 does not include contactor 134 (shown in FIG. 4), rather the partial pre-charge of the high-side to the voltage level of the high energy battery 110 is accomplished using the EMS 120 shown in FIGS. 4-7.

During use, EMS 120 is enabled and the associated control algorithm programmed in EMS 120, pre-charges a local phase-a filter capacitor 310. Specifically, EMS 120 pre-charges capacitor 310, and its' associated voltage sensor 313, through an appropriate inductor 312 to a level that is approximately equal to the voltage level of the high energy battery 110. At this point, a contactor 314 is energized with a minimal transient current through an associated electrical contactor 316, thus achieving a long life. Further pre-charge of a high-side ultracapacitor 140 to a predetermined voltage value is performed using energy from the high energy battery 110. A phase b filter capacitor 330, and its' related voltage sensor 332 are then pre-charged through an appropriate inductor 315 to a voltage level within approximately 0.95*Vc1, wherein Vc1 is the voltage level seen at capacitor 130. Another contactor 340 is then energized with a minimal transient current through its' associated electrical contacts, thus achieving a long life. At this point, ultracapacitor 130 is partially pre-charged to a predetermined voltage level that is less than the voltage level seen at the high-side bus 124, using the EMS 120 and energy supplied from a combination of the high-side ultracapacitor 140 and the high energy battery 110.

Figure 9:
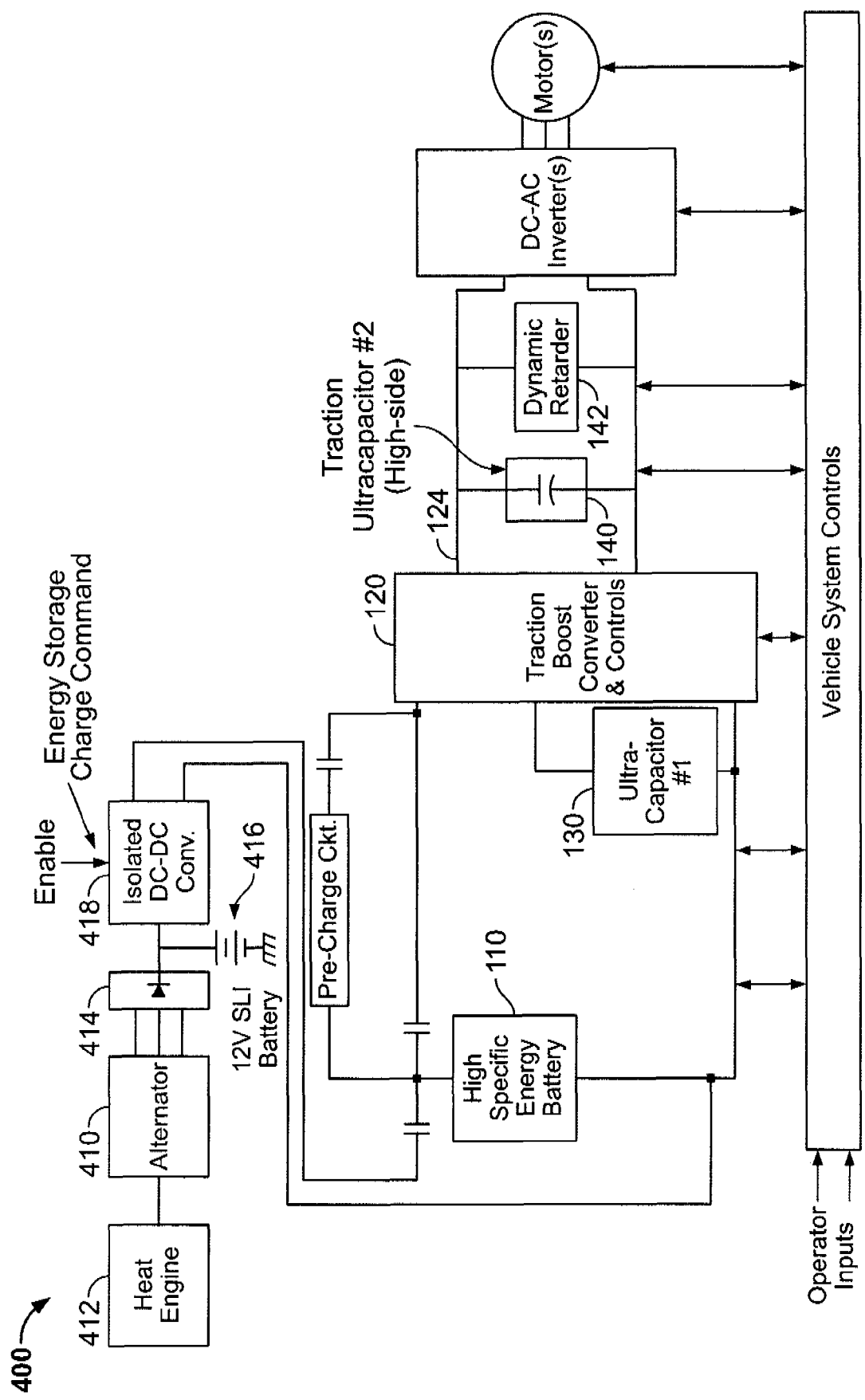
FIG. 9 illustrates another exemplary vehicle propulsion system.

FIG. 9 illustrates a system 400 that is substantially similar to system 100 shown in FIG. 4. As such numbers used to indicate components in FIG. 4 will be used to indicate the similar component in FIG. 9. In this embodiment, system 400 is configured to charge the high energy battery 110 using a vehicle alternator 410. More specifically, system 400 includes alternator 410 that is driven by a heat engine 412, a rectifier 414, and a 12 volt Starting Lighting and Ignition (SLI) battery 416 that are utilized to charge the high-specific energy battery 110 through a DC-DC converter 418. In the exemplary embodiment, the converter 418 facilitates isolating the voltage supplied to the battery 110 from the vehicle chassis. In the exemplary embodiment, alternator 410 is coupled to and driven by a known engine 412 within the vehicle. During operation, the charge power level of battery 110 may be limited, based on the current rating of the alternator 410 and it's associated circuits and also due to the alternator's relatively low efficiency. However, this feature will provide some low-level charging, especially while the vehicle is idling or at low speed operation.

During operation, EMS 120 is programmed to enable DC-DC converter 418, as described in FIG. 6 wherein DC-DC converter 418 is a simplified version of the AC-DC converter of the Integrated Cranking Inverter & Boost Converter for a series Hybrid Drive System, as taught by King in U.S. Pat. No. 5,589,743. Moreover, system 400 still includes dynamic retarder 142 shown in previous figures herein.

Figure 10:
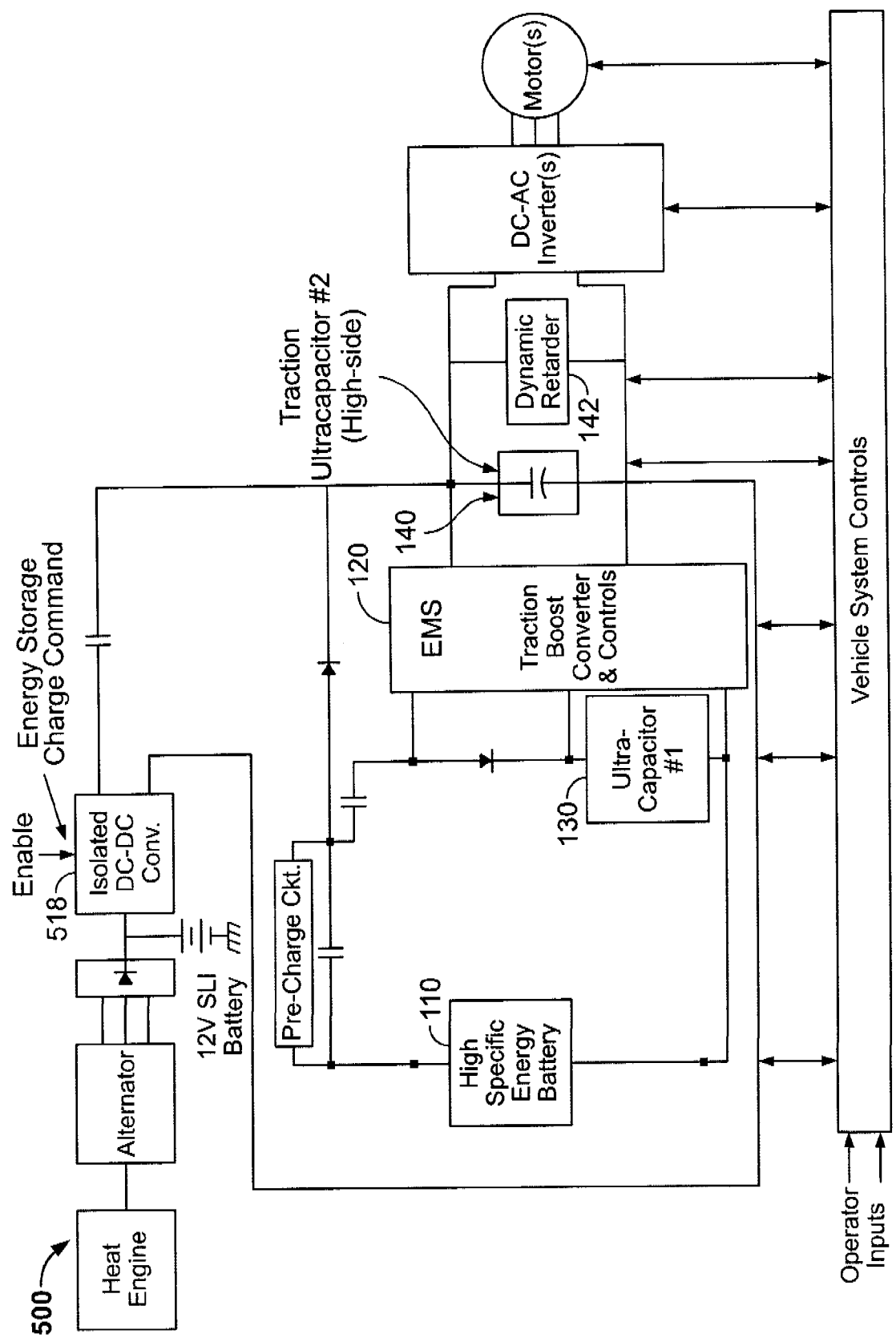
FIG. 10 illustrates another exemplary vehicle propulsion system.

FIG. 10 illustrates a system 500 that is substantially similar to system 400 shown in FIG. 9. As such numbers used to indicate components in FIG. 9 will be used to indicate the similar component in FIG. 10. In this embodiment, system 500 includes an isolated DC-DC converter 518 that has an increased output voltage compared to the DC-DC converter 418 shown in FIG. 9 such that during operation, an enable signal transmitted by EMS 120 is programmed to charge the high-side energy storage unit, i.e. ultracapacitor 140.

Figure 11:
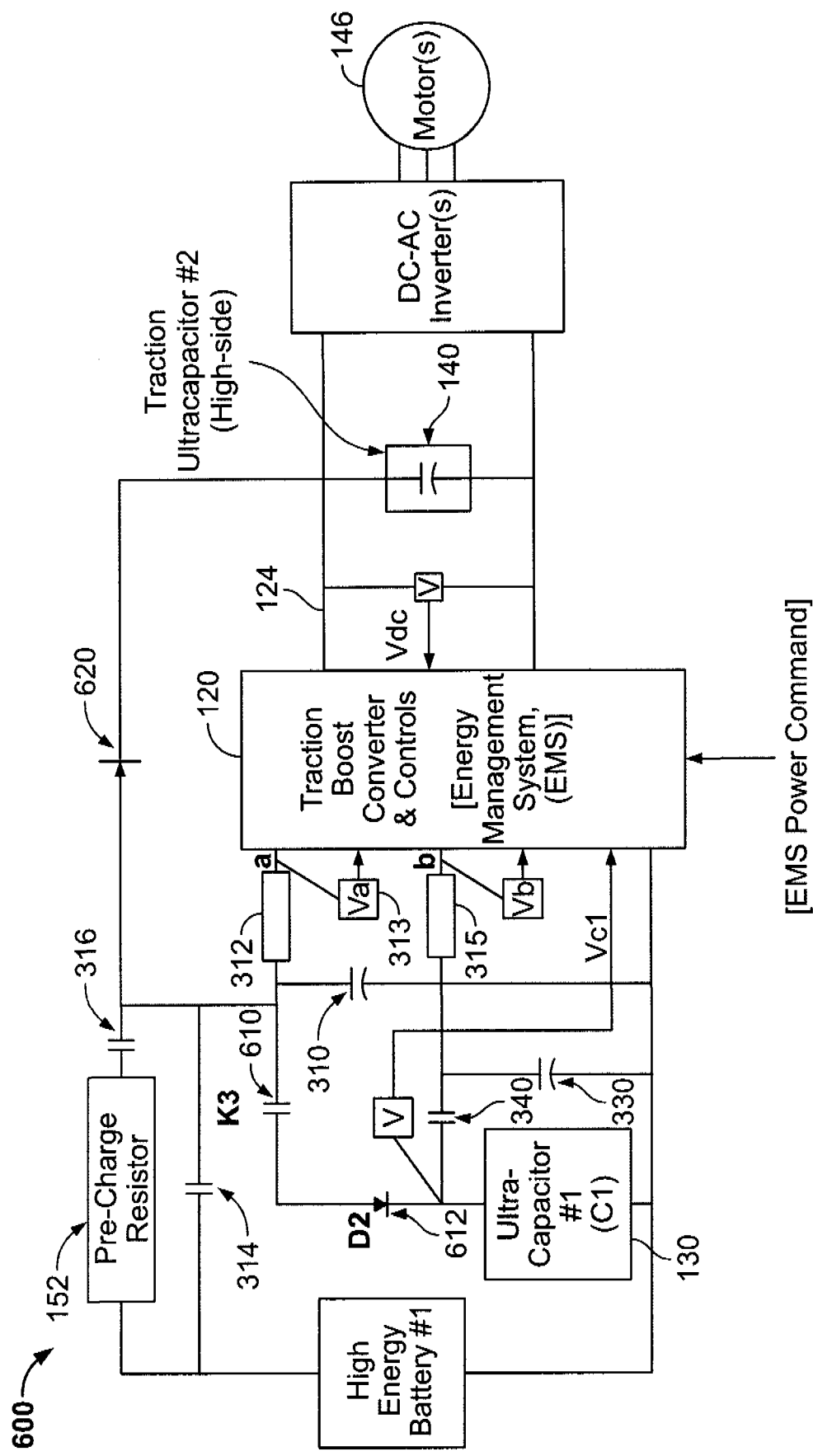
FIG. 11 illustrates another exemplary vehicle propulsion system.

FIG. 11 illustrates a system 600 that is substantially similar to system 400 shown in FIG. 9. As such numbers used to indicate components in FIG. 9 will be used to indicate the similar component in FIG. 11. Specifically, FIG. 11 illustrates another exemplary pre-charge control with efficient EMS operation during operation of ultracapacitor 130 operating at low voltage. As such, system 600 also includes a contactor 610 and a diode 612 which together allow increased operational efficiency of the EMS 120 by using two phases of the EMS during periods when ultracapacitor 130 is discharged to a level approximately equal to the high energy battery 110.

In the exemplary embodiment, system 600 also includes an external uni-directional current device 620 that is poled to allow current flow from the second energy storage unit 110 to the high voltage side 124 of the EMS 120 via the pre-charge circuit 152. In the exemplary embodiment, the external uni-directional current device 620 is a diode. In use, external uni-directional current device 150 facilitates channeling current from the pre-charge circuit 152 to the high-side 124 of the EMS/traction boost converter 120 to at least partially precharge the high-side ultracapacitor 140 from it's initial assumed discharge state, and also provides power to the traction drive system 147 during a "Limp-home" mode of operation in event of failure of the boost converter system. Optionally, system 600 does not include external diode 620.

Figure 12:
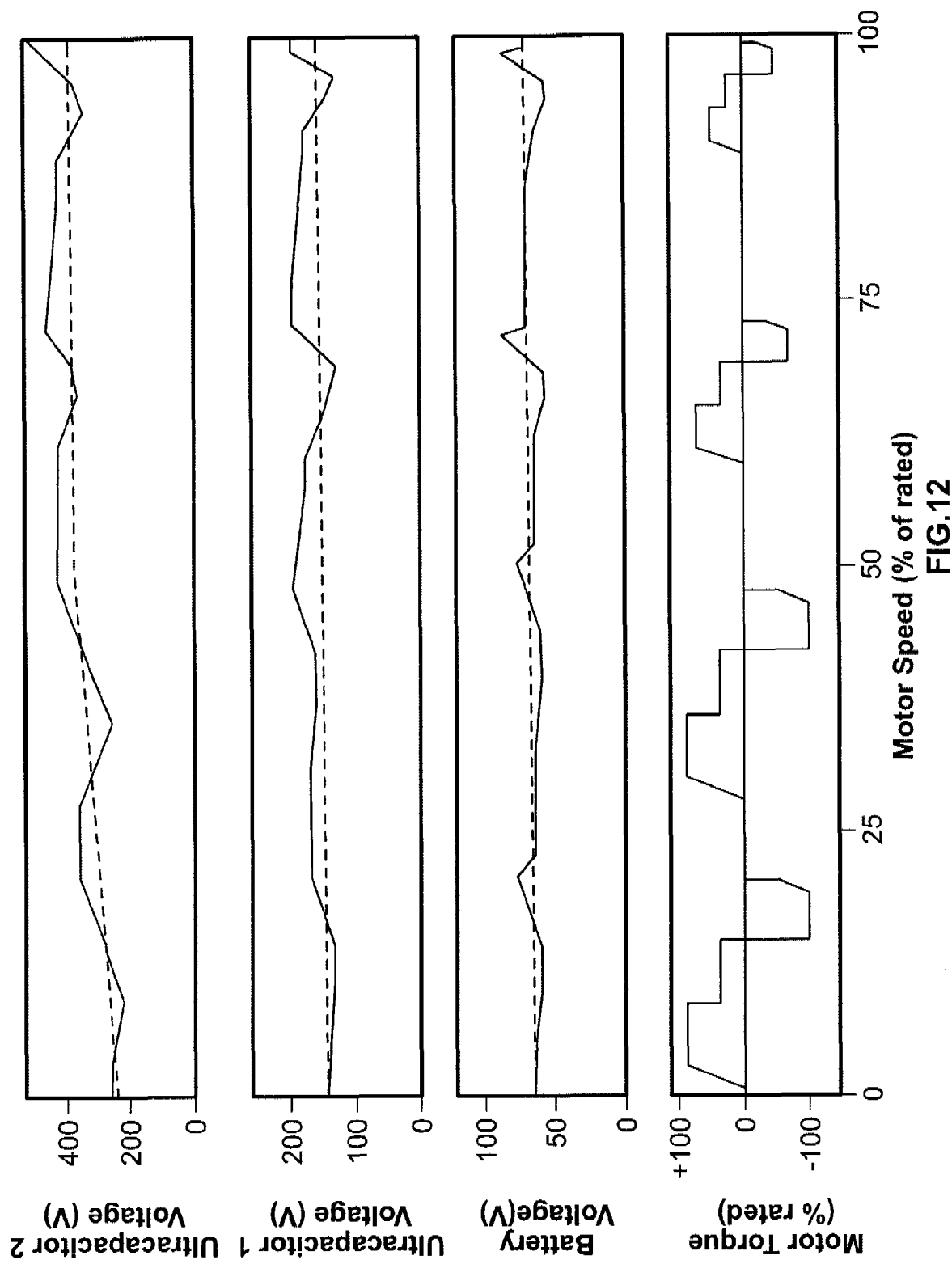
FIG. 12 is graphical illustration of the systems shown in FIGS. 4 through 11 during operation.

FIG. 12 is a graphical illustration wherein the DC Link voltage 124 is shown as a function of the motor speed and torque, and wherein the dotted lines represent the exemplary reference values for the associated energy storage component voltages. As shown, the full torque of the drive, for an exemplary AC motor design, is achievable by ramping the reference voltage from some predetermined minimum value to a predetermined maximum reference value at a motor speed of approximately 50% of rated speed. From 50% to 100% rated motor speed, the reference DC Link voltage is held substantially constant. As shown, ultracapacitor 140 voltage fluctuates above and below the reference line as energy is being extracted from or supplied to the device. As the ultracapacitor 140 voltage, i.e. State of Charge approaches the limit, the closed loop control provides additional energy, primarily from ultracapacitor 130, provided it is within its normal operating range (SOC). When, ultracapacitor 130 is unable to provide the energy, the lower efficiency battery 110 is utilized to provide additional energy. For example, during operation while climbing steep grades for an extended time period, the high-specific energy battery 110 provides the energy, since the energy stored in both ultracapacitors 130 and 140 is substantially depleted. Also, during the limp-home mode, the energy provided the propel the vehicle will be supplement using battery 110.

Figure 13:
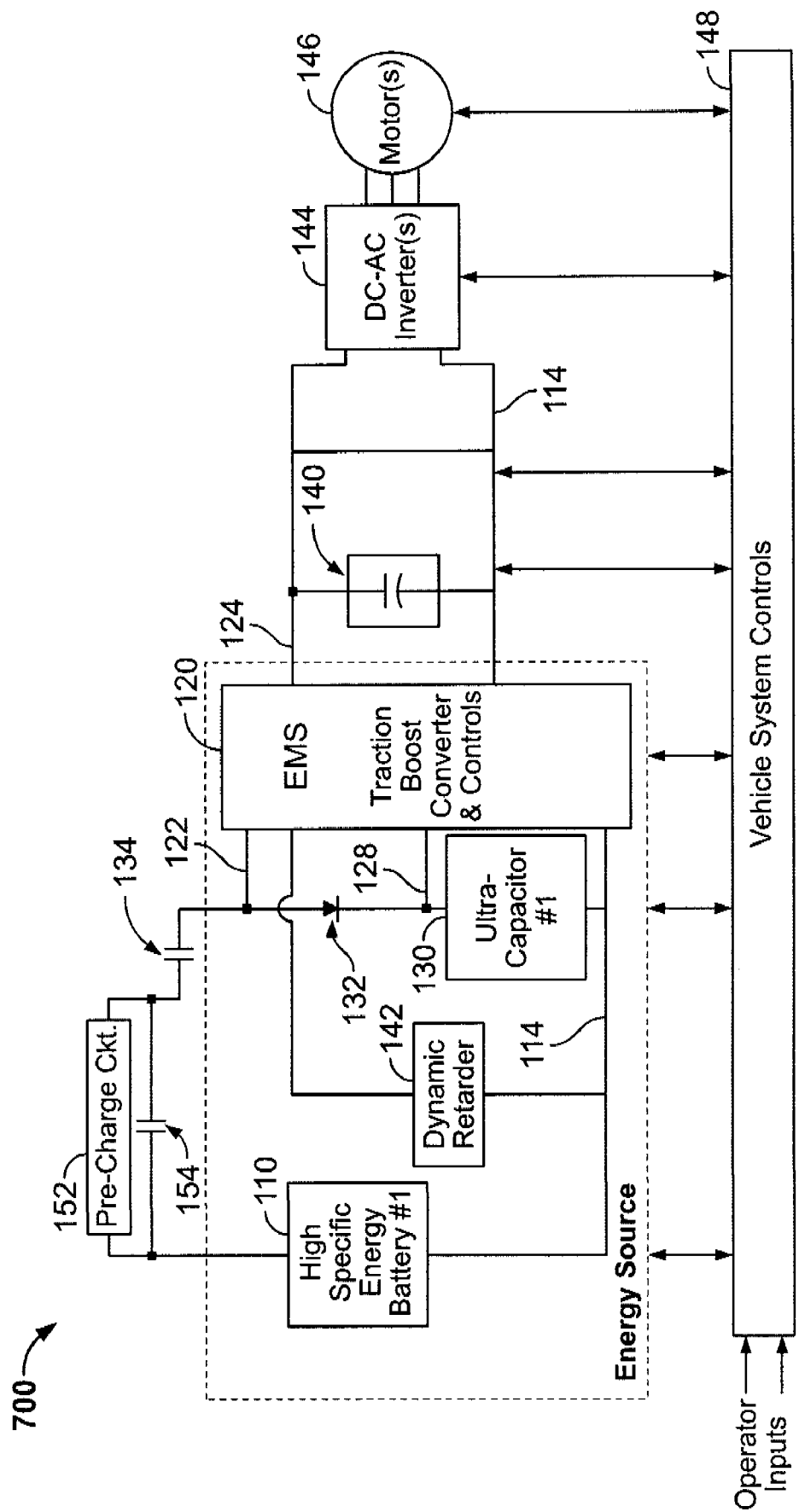
FIG. 13 illustrates another exemplary vehicle propulsion system.

FIG. 13 illustrates a system 700 that is substantially similar to system 100 shown in FIG. 4. As such numbers used to indicate components in FIG. 4 will be used to indicate the similar component in FIG. 13. In system 700, dynamic retarder 142 is not coupled on the high voltage side of boost converter 120, rather the dynamic retarder 142 is coupled on the low voltage side of boost converter 120. An additional phase of the EMS 120 uses a power command to control the value of the dc link during severe regeneration operation when the energy storage units are near their maximum voltage limits. More specifically, in this configuration, dynamic retarder 142 controllably varies the effective power dissipation on the DC link 124 through control of the boost converter and thereby limits the DC voltage developed across the Inverter DC link 124 with respect to 114.

Figure 14:
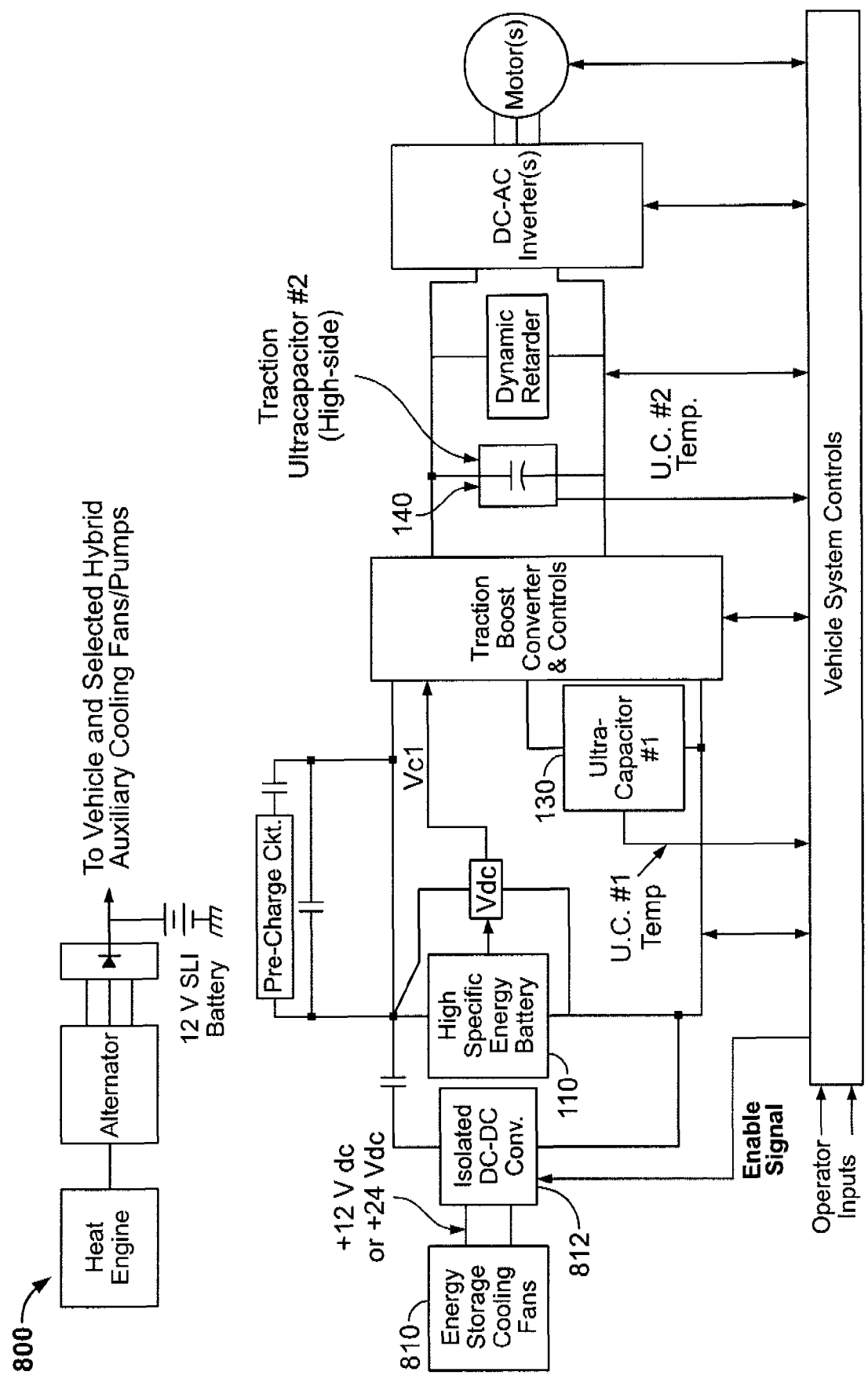
FIG. 14 illustrates another exemplary vehicle propulsion system.

FIG. 14 illustrates a system 800 that is substantially similar to system 100 shown in FIG. 4. As such numbers used to indicate components in FIG. 4 will be used to indicate the similar component in FIG. 14. In this embodiment, system 800 is configured to provide isolated electrical power operation of at least one fan 810 to provide temperature control of the energy storage units including ultracapacitors 130, 140 and/or battery 110 using power provided by the high specific energy battery 110 on the low-side of the electric propulsion system. Closed loop operation is provided by the vehicle system controls using sensed feedback temperature, from the respective energy storage units, 110, 130 and 140. When the temperature exceeds a predetermined set point, an isolated DC-DC converter 812 is enabled to isolate the energy storage units from their prospective 12 VDC or 24 VDC power supplies. In the exemplary embodiment, system 800 allows cooling of the energy storage units even during periods when the traction drive is disabled. This is especially important while the vehicle is parked on blacktop during periods of bright sunshine. Since the life of an ultracapacitor or battery is reduced during periods at elevated temperature, system 800 activates the cooling fans 810 to reduce the temperature on the respective energy storage device. At a later point when the vehicle is again operational, the high-specific energy battery is recharged using energy provided from either the traction drive during regenerative braking event or while the heat engine is charging the energy storage system.

The systems described herein facilitate providing a highly efficient utilization of the ultracapacitor/battery energy storage system. Specifically, transient energy for operation at high motor speed and torque primarily uses a high voltage ultracapacitor in a high efficiency mode, and such that transient energy for operation at moderate speed and torque primarily uses a combination of a high voltage and moderate voltage ultracapacitors, and transient energy for operation at low motor speed and the full range of motor torque is provided primarily by combination of low voltage battery and the moderate voltage ultracapacitor. As such, ultracapacitor cell balancing issues are minimized by using both multiple ultracapacitor energy storage units with high and moderate voltage requirements Therefore, the systems described herein facilitate decoupling the DC link voltage from the moderate and low voltage energy storage components which allows improved system performance and efficiency by utilizing the proper energy storage system and associated control as a function of motor speed and torque. The system weight, and thus the weight of the vehicle, is minimized by using a low-voltage, light weight battery as one component of the energy storage. During, All-Electric mode of operation, and also during Limp-Home mode, the systems provide increased range in comparison to configurations that use only ultracapacitor energy storage systems. Moreover, the overall system cost is reduced by sizing the energy storage units to simultaneously achieve the desired performance within component size and weight limits for the electric drive system, and the pre-charge function of the high-side ultracapacitor energy storage is achieved in less time than if the pre-charge function is performed from a conventional high voltage battery.

While the invention has been described in terms of various specific embodiments, those skilled in the art will recognize that the invention can be practiced with modification within the spirit and scope of the claims.

What is claimed is:

1. A vehicle propulsion system comprising:
   an alternating current (AC) traction drive system;
   a bi-directional boost converter comprising a high voltage side and a low voltage side, said bi-directional boost converter electrically coupled to said AC traction drive system;
   a first energy storage system including a direct current (DC) link electrically coupling said first energy storage system to said AC traction drive system, said first energy storage system comprising at least one of a first ultracapacitor and a first high specific power battery coupled on said high voltage side;
   a second energy storage system electrically coupled to said AC traction drive system such that a voltage output from said second energy storage system is decoupled from said DC link using said bi-directional boost converter;
   an energy management system configured to control said first and second energy storage systems when a vehicle is operating in at least one of a pre-charge mode and a normal operation mode with said AC traction drive system enabled; and
   a pre-charge circuit configured to at least partially charge said first ultracapacitor.

2. A vehicle propulsion system in accordance with claim 1 further comprising a diode poled between said pre-charge circuit and said first ultracapacitor.

3. A vehicle propulsion system in accordance with claim 1, wherein said energy management system is configured to control said pre-charge circuit when said first ultracapacitor is operating at a relatively low voltage.

4. A vehicle propulsion system comprising:
   an alternating current (AC) traction drive system;
   a bi-directional boost converter comprising a high voltage side and a low voltage side, said bi-directional boost converter electrically coupled to said AC traction drive system;
   a first energy storage system electrically coupled to said AC traction drive system through a direct current (DC) link;
   a second energy storage system electrically coupled to said AC traction drive system such that a voltage output from said second energy storage system is decoupled from said DC link using said bi-directional boost converter;
   a current sensor coupled to said DC link; and
   an energy management system configured to receive an output from said current sensor to control said first and second energy storage systems when a vehicle is operating in at least one of a pre-charge mode and a normal operation mode with said AC traction drive system enabled.

5. A vehicle propulsion system in accordance with claim 4, further comprising a voltage sensor coupled to said DC link, said energy management system configured to receive an output from said voltage sensor to control said first and second energy storage systems when the vehicle is operating in at least one of the pre-charge mode and the normal operation mode with said AC traction drive system enabled.

6. A vehicle propulsion system in accordance with claim 5, wherein said energy management system comprises an algorithm programmed to receive said current sensor output, filter said current sensor output, and use said filtered current sensor output to generate a first component utilized to compute an AC traction drive system load power.

7. A vehicle propulsion system in accordance with claim 6, wherein said algorithm is further programmed to receive said voltage sensor output, and use said voltage sensor output to generate a second component utilized to compute said AC traction drive system load power.

8. A vehicle propulsion system in accordance with claim 7, wherein said algorithm is further programmed to multiply said first component with said second component to compute said AC traction drive system load power.

9. A vehicle propulsion system in accordance with claim 8, wherein said energy management system is further configured to receive a filtered traction motor speed signal, said algorithm is further programmed to divide the filtered traction motor speed signal by a maximum rated motor speed to generate a percent motor rated speed signal that is one input to a two dimensional look-up table, said computed traction drive system load power signal is a second input to said look-up table, and said look-up table is configured to provide a DC bus reference voltage command output signal that varies as a function of motor speed for a family of motor torque curves in an optimized manner that minimize motor and drive component system losses to improve drive system efficiency during low-speed operation and light torque operation as well as during medium and high power traction drive operation.

10. A vehicle propulsion system in accordance with claim 9, wherein said algorithm comprises a first subroutine that includes a proportional-integral controller that sums the DC bus reference voltage command output signal and an input from a direct current (DC) bus voltage sensor to drive the high voltage side of said AC traction drive system towards a varying DC bus reference voltage.

11. A vehicle propulsion system in accordance with claim 10, wherein said algorithm further comprises a second subroutine programmed to receive an input from a direct current bus current sensor, and based on the input generate an adjustable gain signal that is based on a value of a direct current bus voltage and a specific mode of operation signal.

12. A vehicle propulsion system in accordance with claim 11, wherein said algorithm further comprises a third subroutine programmed to reduce a portion of a total power command signal transmitted to said energy management system when a direct current link voltage exceeds a predetermined voltage upper limit.

13. A vehicle propulsion system in accordance with claim 12, wherein said algorithm is further programmed to sum outputs from said first, second, and third subroutines, and pass the summed outputs through an asymmetric limiter to generate a total energy management system power command.

14. A vehicle propulsion system comprising:
an alternating current (AC) traction drive system;
a bi-directional boost converter comprising a high voltage side and a low voltage side, said bi-directional boost convertor electrically coupled to said AC traction drive system;
a first energy storage system electrically coupled to said AC traction drive system through a direct current (DC) link;
a second energy storage system electrically coupled to said AC traction drive system, a voltage output from said second energy storage system decoupled from said DC link using said bi-directional boost converter, said second energy storage system comprising at least one of an ultracapacitor and a high specific energy battery coupled on said low voltage side; and
an energy management system configured to control said first and second energy storage systems when a vehicle is operating in at least one of a pre-charge mode and a normal operation mode with said AC traction drive system enabled, wherein said energy management system is programmed to generate a power command signal to control a relative power between said ultracapacitor and said high specific energy battery as a function of an operational mode of the vehicle, an ultracapacitor voltage and an ampere hour rating of said high specific energy battery.

15. A vehicle propulsion system in accordance with claim 14, wherein said operational mode comprises at least one of a motoring mode and a regenerating mode.

16. A vehicle propulsion system in accordance with claim 14, wherein said energy management system is further programmed to utilize a piecewise linear power limit function to generate a power command signal.

17. A vehicle propulsion system in accordance with claim 14, wherein said energy management system is further programmed to utilize a computed ampere hour value of said high specific energy battery and the ampere hour rating of said high specific energy battery to determine a relative power split between said ultracapacitor and said high specific energy battery.

18. A vehicle propulsion system in accordance with claim 17, wherein said bi-directional boost converter comprises a multi-phase boost converter and a precharge circuit, said precharge circuit is configured to precharge a filter capacitor to a voltage that is within a given threshold of a voltage on said ultracapacitor on one or more phases of said multi-phase boost converter.

19. A vehicle propulsion system in accordance with claim 14, wherein said energy management system is further programmed to generate a signal to initiate an additional energy storage charge command whenever an ampere hour value of said high specific energy battery is less than a predetermined value.

20. A vehicle propulsion system comprising:
an alternating current (AC) traction drive system;
a bi-directional boost converter comprising a high voltage side and a low voltage side, said bi-directional boost converter electrically coupled to said AC traction drive system;
a first energy storage system electrically coupled to said AC traction drive system through a direct current (DC) link;
a second energy storage system electrically coupled to said AC traction drive system such that a voltage output from said second energy storage system is decoupled from said DC link using said bi-directional boost converter;
an energy management system configured to control said first and second energy storage systems when a vehicle is operating in at least one of a pre-charge mode and a normal operation mode with said AC traction drive system enabled; and
a DC-DC converter electrically coupled to a vehicle alternator rectifier output and a vehicle starting, lighting, and ignition battery providing a low-level charge of a high specific energy battery coupled on said low voltage side of said bi-directional boost converter with galvanic isolation provided between a vehicle chassis and a plurality of high-voltage traction electrical components.

21. A vehicle propulsion system comprising:
an alternating current (AC) traction drive system;
a bi-directional boost converter comprising a high voltage side and a low voltage side, said bi-directional boost converter electrically coupled to said AC traction drive system;
a first energy storage system electrically coupled to said AC traction drive system through a direct current (DC) link;
a second energy storage system electrically coupled to said AC traction drive system such that a voltage output from said second energy storage system is decoupled from said DC link using said bi-directional boost converter;
an energy management system configured to control said first and second energy storage systems when a vehicle is operating in at least one of a pre-charge mode and a normal operation mode with said AC traction drive system enabled;
at least one cooling fan; and
at least one temperature sensor, said energy management system configured to operate said at least one cooling fan based on an output from said at least one temperature sensor to facilitate cooling at least one of said first and second energy storage systems.

22. A vehicle propulsion system in accordance with claim 21, further comprising a DC-DC converter coupled to said at least one cooling fan, said DC-DC converter configured to isolate said at least one cooling fan from a plurality of high-voltage traction electrical components.

23. A vehicle propulsion system in accordance with claim 21, wherein said at least one cooling fan is activated using power supplied from one of said first and second energy storage systems when said AC traction drive system is disabled or enabled.

24. A vehicle propulsion system in accordance with claim 21, wherein at least one of said first and second energy storage systems is recharged to a predetermined voltage level during normal operation using regenerative energy captured during vehicle deceleration and while engine charging when said AC traction drive system is enabled.

* * * * *